US008006374B1

(12) United States Patent
Zangari

(10) Patent No.: US 8,006,374 B1
(45) Date of Patent: Aug. 30, 2011

(54) PAPERCLIP FASTENING APPARATUS

(76) Inventor: Salvator G. Zangari, West Newton, MA (US)

(*) Notice: Subject to any disclaimer, the term of this patent is extended or adjusted under 35 U.S.C. 154(b) by 602 days.

(21) Appl. No.: 12/144,795

(22) Filed: Jun. 24, 2008

(51) Int. Cl.
*B23Q 7/18* (2006.01)
*B42F 1/02* (2006.01)

(52) U.S. Cl. .............. 29/809; 29/814; 29/284; 227/132; 221/232

(58) Field of Classification Search .................... 29/809, 29/814, 284; 227/132; 221/232
See application file for complete search history.

(56) References Cited

U.S. PATENT DOCUMENTS 3,100,932 A * 8/1963 Pipkin .......................... 221/276
3,235,950 A * 2/1966 Smotzer, Jr. .................. 221/276
3,254,398 A * 6/1966 Macondray et al. ............ 29/814
3,324,538 A * 6/1967 Christensen .................... 29/814
3,402,454 A 9/1968 Hartman et al.
3,429,431 A * 2/1969 Macondray et al. .......... 206/338
3,793,696 A 2/1974 Barr et al.
3,829,954 A * 8/1974 Takamizawa et al. .......... 29/814
4,084,864 A 4/1978 Kibler
4,261,098 A * 4/1981 Lincoln ........................... 29/809
4,299,013 A * 11/1981 Lincoln .......................... 24/67.9
6,206,236 B1 * 3/2001 Hakala .......................... 221/276
D452,530 S 12/2001 Jacquet
6,539,619 B2 4/2003 Hakala
6,557,842 B2 * 5/2003 Conard-White et al. .. 270/58.09
6,978,536 B2 * 12/2005 Gershgoren et al. ............ 29/809
2006/0006191 A1 1/2006 Edens et al.
2008/0127483 A1 * 6/2008 Schmidt .......................... 29/809

* cited by examiner

*Primary Examiner* — Jermie E Cozart

(57) ABSTRACT

A paperclip fastening apparatus includes paperclips each having a first half loop, a second half loop and an inner half loop. A support has an upper surface, a front end and a rear end. A track is positioned in the upper surface. A driving plate is positioned on the upper surface and is slidably movable toward and away from the front end. A housing, containing the paperclips, is attached to the support and the driving plate is slidable through the housing and engages a lowermost one of the paperclips positioned in the housing. The driving plate engages the paperclips and pushes them outwardly of the housing toward the front end while a flange on the house engages the first half loop to lift the first half loop to allow one or more sheets of paper to be placed between the first half loop and the inner half loop.

20 Claims, 9 Drawing Sheets

PAPERCLIP FASTENING APPARATUS

BACKGROUND OF THE INVENTION

Field of the Invention

The present invention relates to paperclip fastening devices and more particularly pertains to a new paperclip fastening device for assisting a person in using a paperclip to couple together a plurality of sheets of paper.

SUMMARY OF THE INVENTION

The present invention meets the needs presented above by generally comprising paperclips each having a first half loop, a second half loop and an inner half loop positioned between the first and second half loops. The inner loop is positioned nearer to the first outer loop than the second half loop. A support has an upper surface, a front end and a rear end. A track is positioned in the upper surface. A driving plate is positioned on the upper surface and has a proximal end with respect to the front end. The proximal end is slidably movable toward and away from the front end. The driving plate has a first slot therein and a second slot therein. The first and second slots are configured to receive the second half loop and the middle half loop of one of the paperclips. A housing is attached to the support and extends upwardly therefrom. The driving plate is slidable through the housing and engages a lowermost one of the paperclips positioned in the housing. The driving plate is positionable in a receiving position having each of the first and second slots positioned in the housing or in a deployed position having the first and second slots positioned out of the housing between the housing and the front end of the support. The housing includes a perimeter wall that has a top edge. The top edge defines an opening extending into the housing. The housing has a top wall removably mounted on the top edge to selectively close the opening. A mounting is attached to and extends downwardly from the top wall. The mounting extends from the top wall to the driving plate when the top wall is positioned on the top edge. The mounting is configured to receive a plurality of aligned ones of the paperclips and gravity feed the paperclips onto the driving plate. The perimeter wall has a front wall facing the front edge. The front wall has an aperture extending therethrough adjacent to a bottom end of the perimeter wall. A flange is attached to an inner surface of the front wall below and adjacent to the aperture and extends inwardly of the housing. The flange abuts the first half loop of a lowermost one of the paperclips when the paperclips are positioned in the housing. The flange forces the first half loop upwardly when the second half loop and inner half loop of an associated one of the paperclips are placed in the first and second slots and forced toward the forward end and under the flange by the driving plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
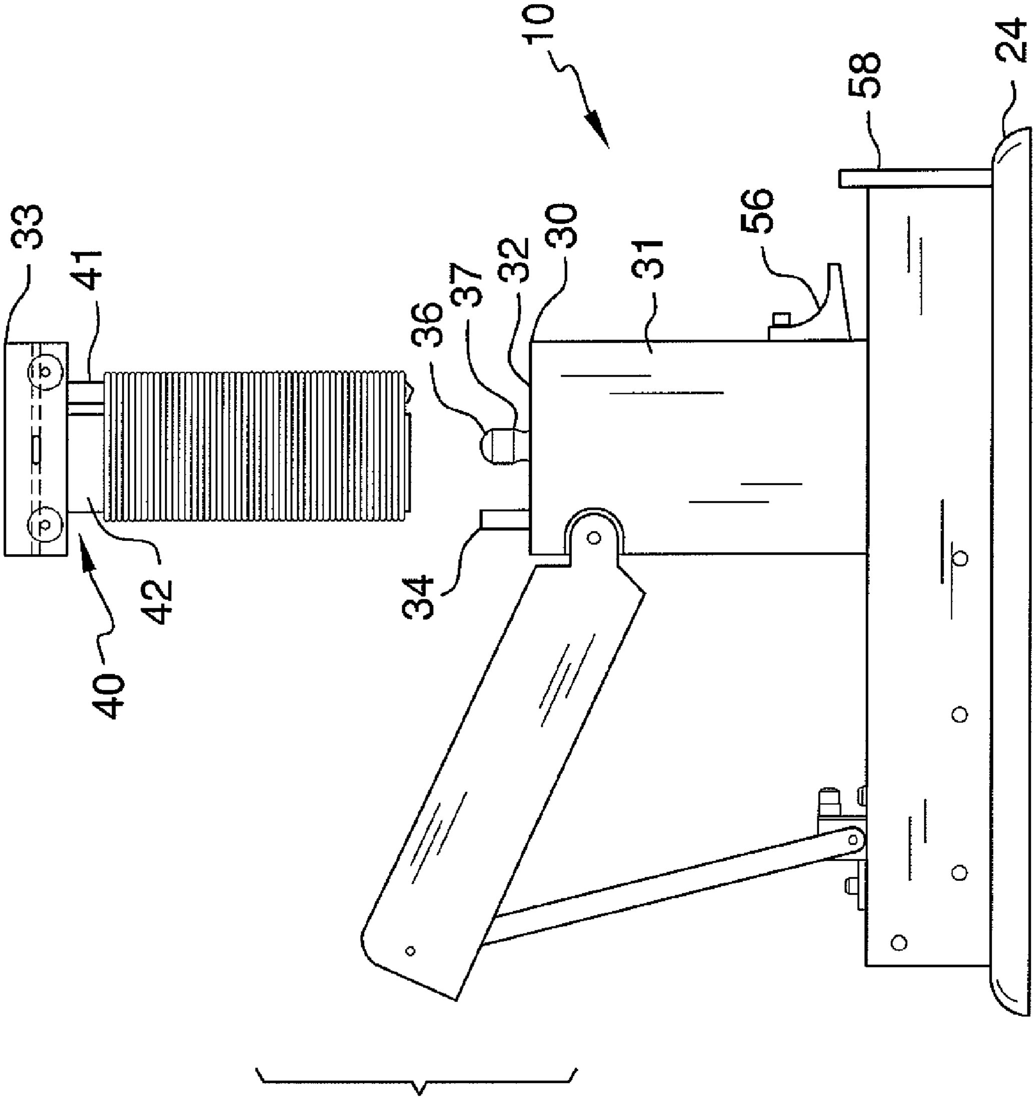
FIG. 1 is a side expanded view of a paperclip fastening apparatus according to the present invention.
Figure 2:
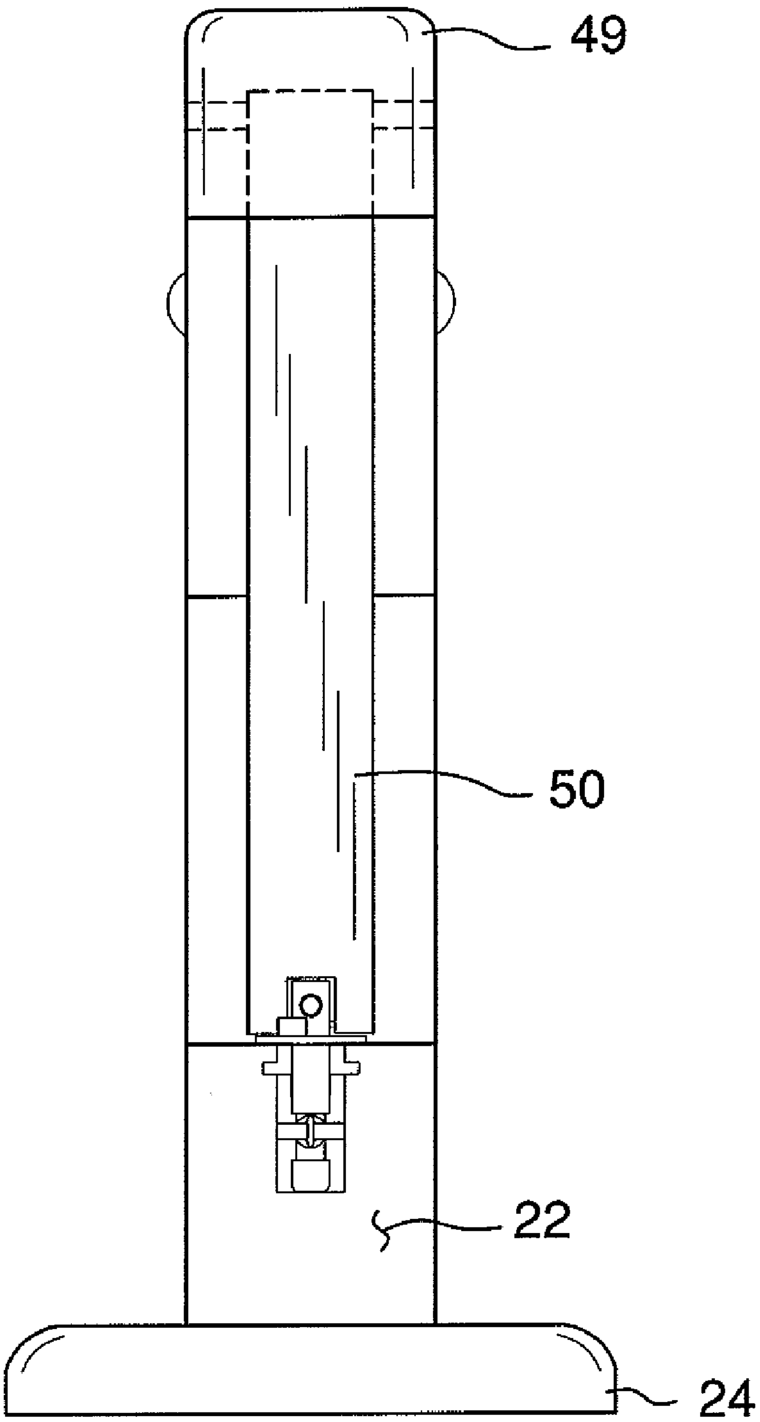
FIG. 2 is a rear view of the present invention.
Figure 3:
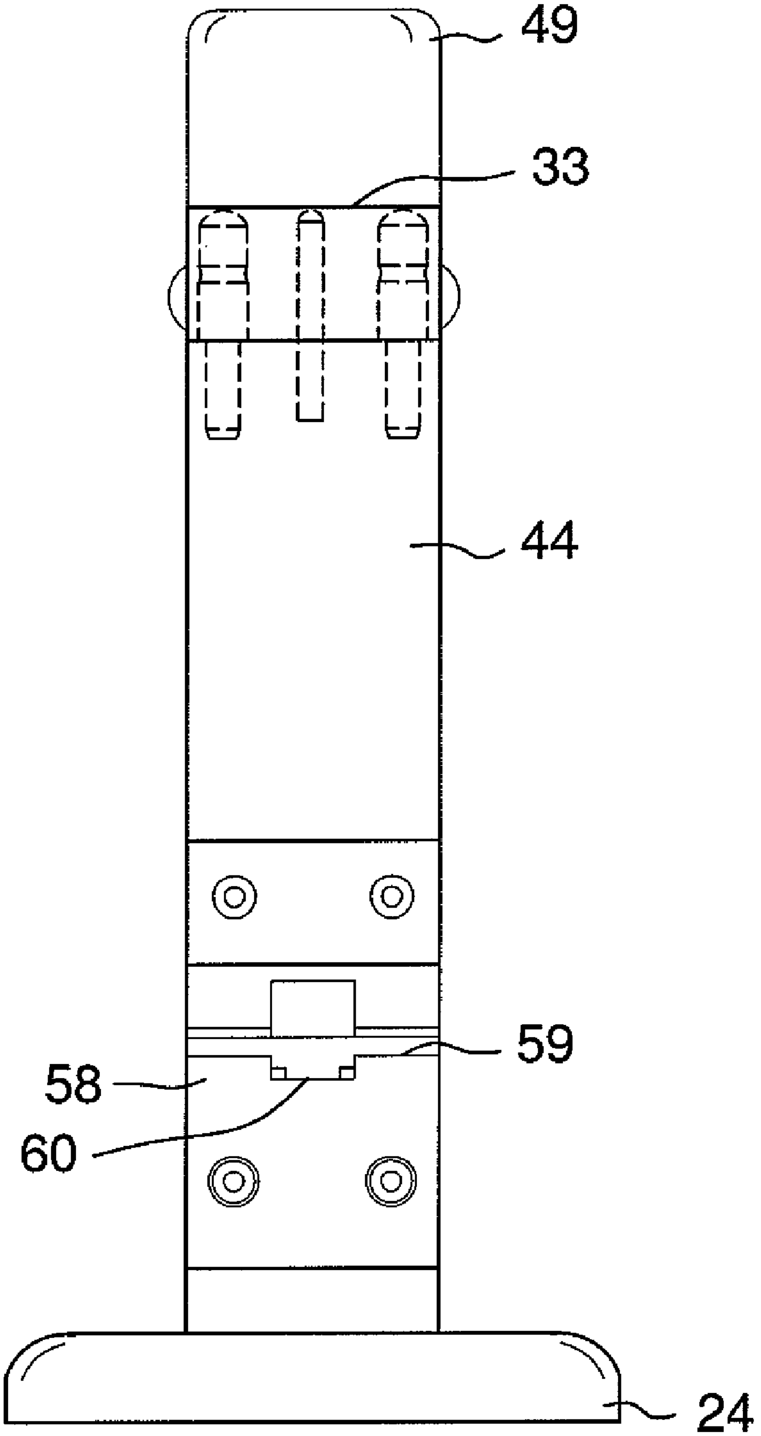
FIG. 3 is a front view of the present invention.
Figure 4:
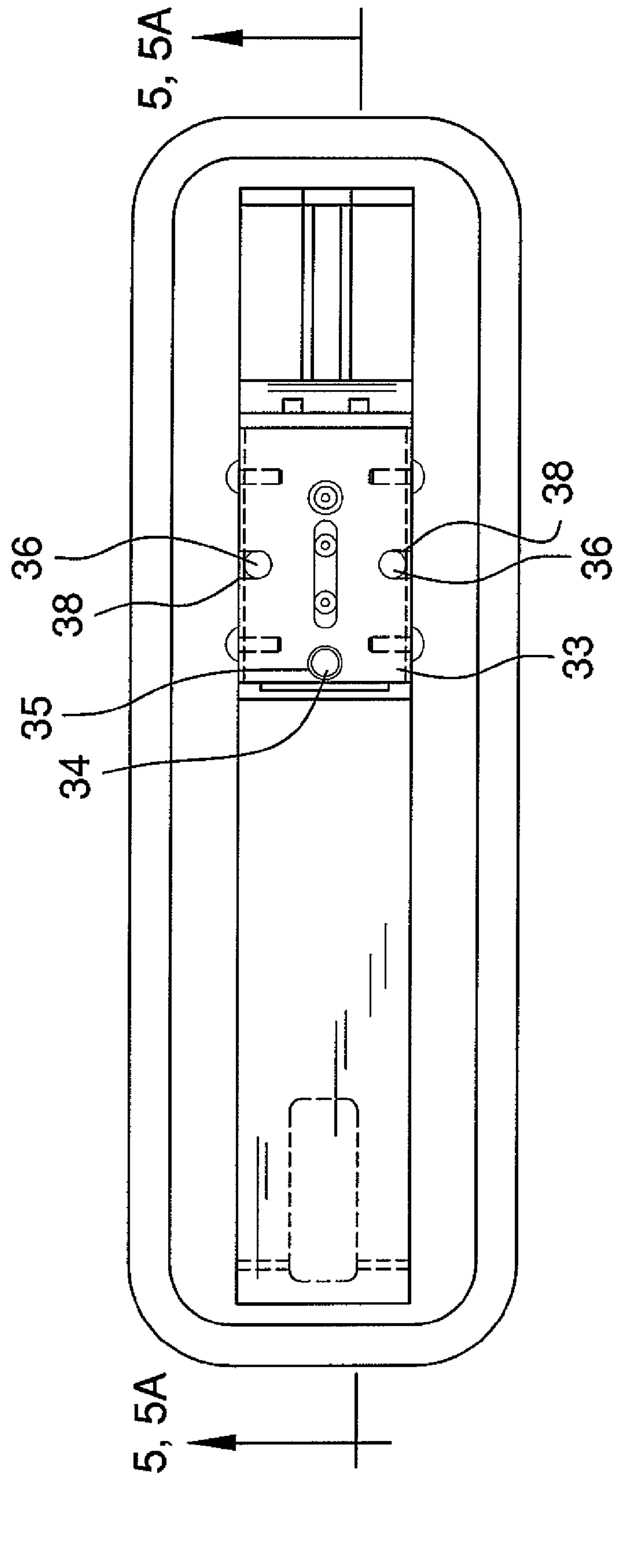
FIG. 4 is a top view of the present invention.
Figure 5:
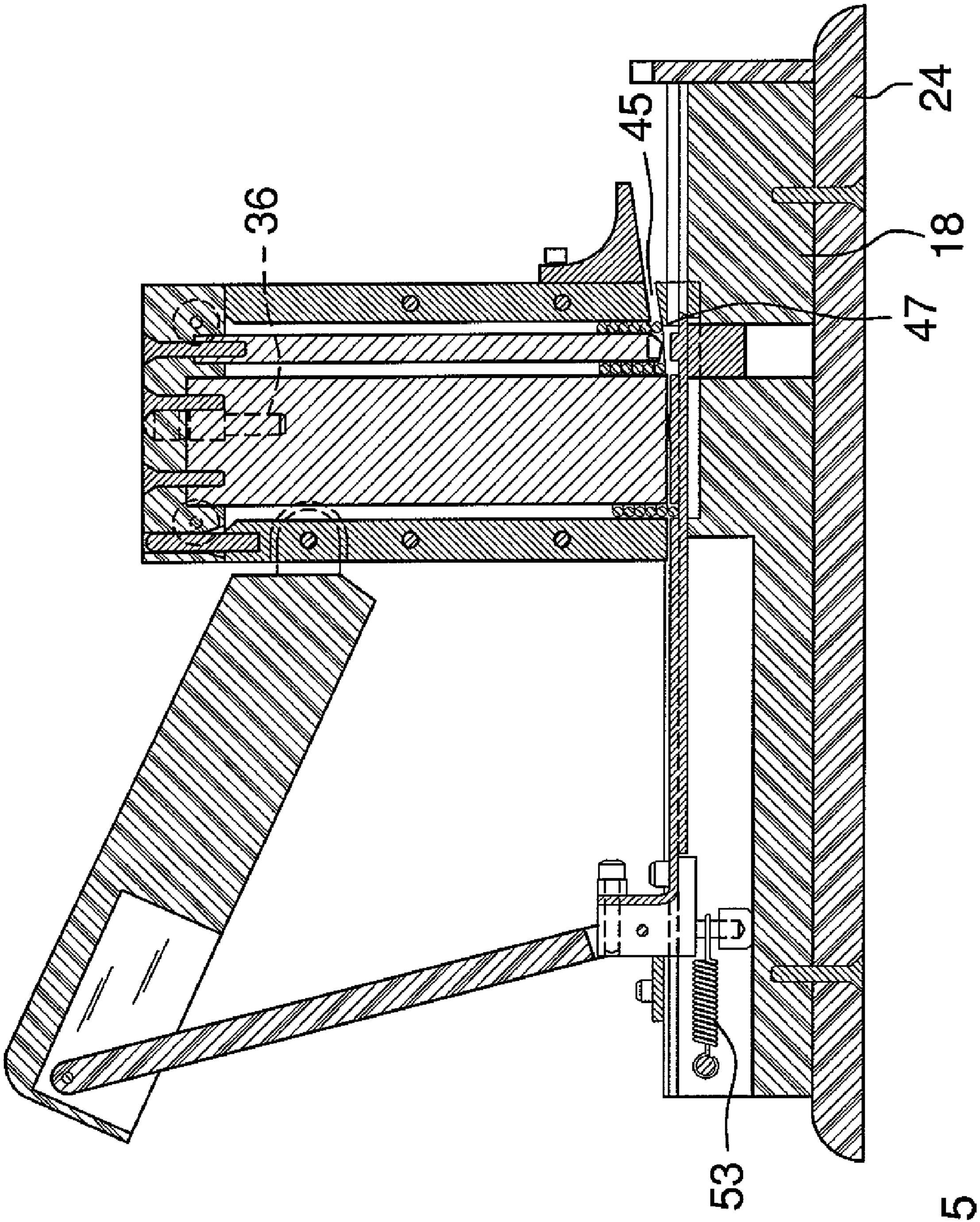
FIG. 5 is a cross-sectional view taken along line 5-5 of FIG. 4 the present invention showing a driving plate in a receiving position.
Figure 5A:
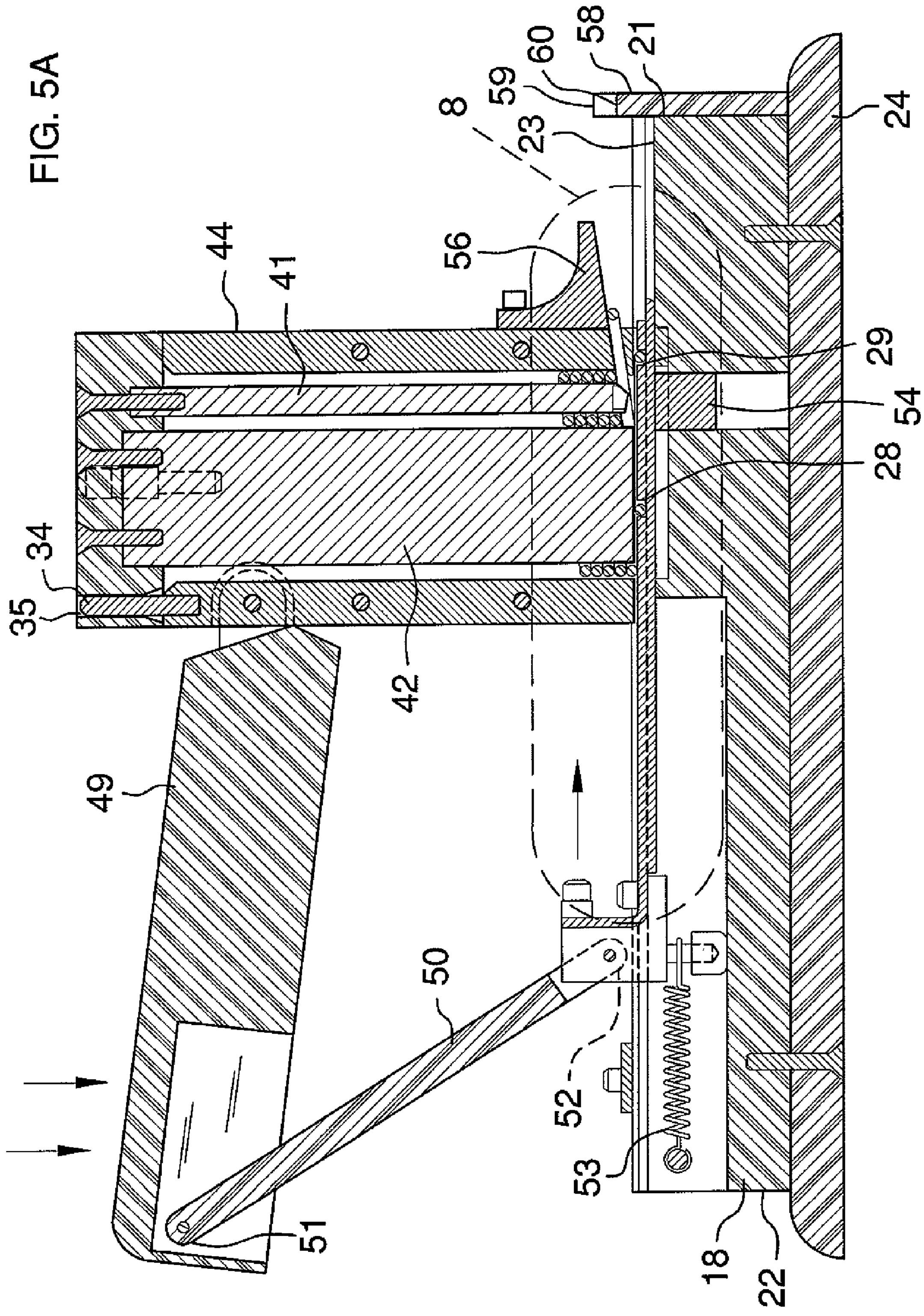
FIG. 5A is a cross-sectional view of the present invention taken along line 5A-5A of FIG. 4 showing the driving plate moving toward a deployed position.
Figure 6:
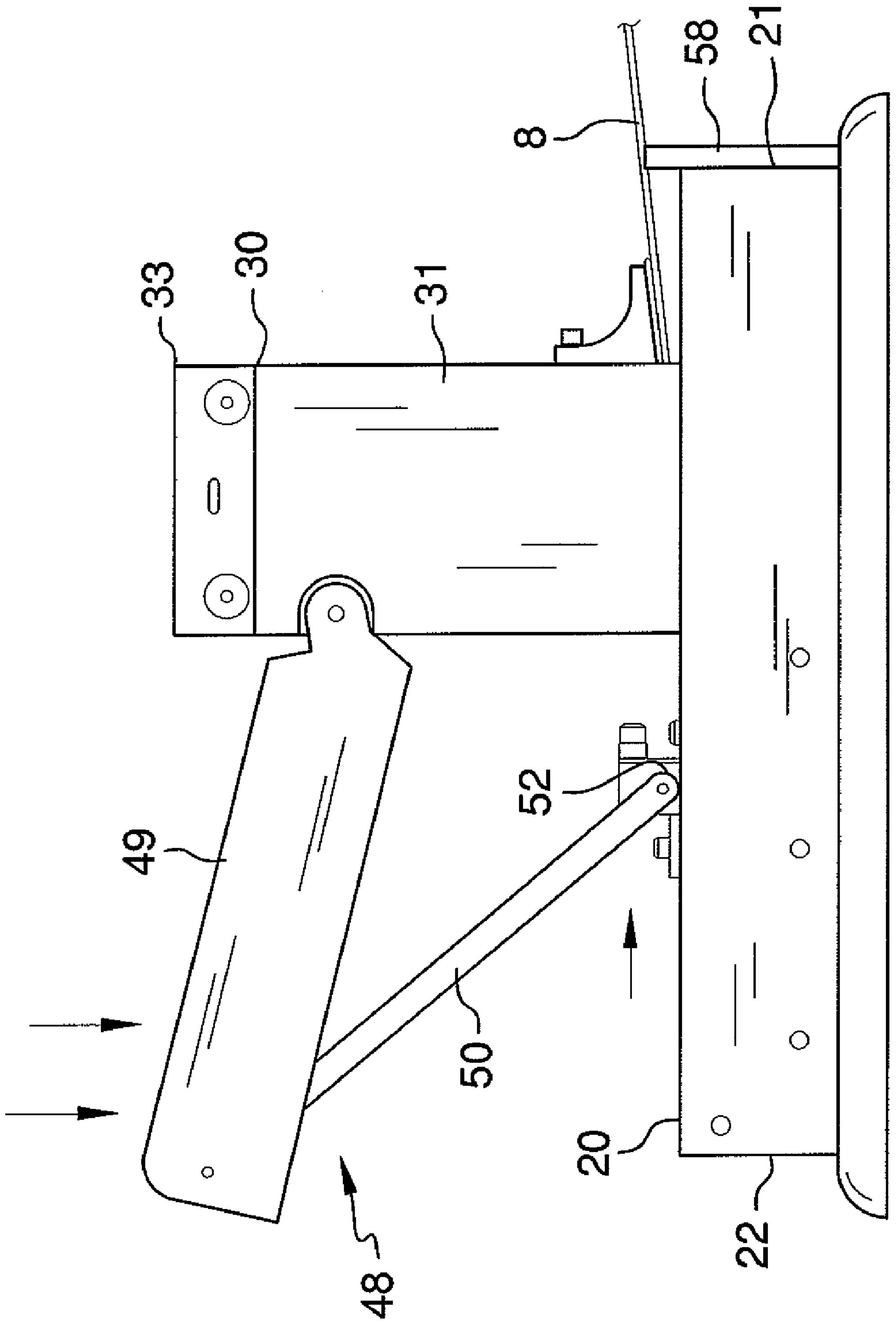
FIG. 6 is a side view of the present invention.

With reference now to the drawings, and in particular to FIGS. 1 through 8 thereof, a new paperclip fastening device embodying the principles and concepts of the present invention and generally designated by the reference numeral 10 will be described.

As best illustrated in FIGS. 1 through 8, the paperclip fastening apparatus 10 generally comprises a plurality of conventional paperclips 12 each having a first half loop 13, a second half loop 14 and an inner half loop 15 positioned between the first 13 and second 14 half loops. The inner half loop 15 is positioned nearer to the first outer loop 13 than the second half loop 14. The paperclips 12 are aligned with each other. A removable tab 16 is adhered to each of the paperclips to retain the paperclips 12 in alignment with each other.

A support 18 is provided that has an upper surface 20, a front end 21 and a rear end 22. A track 23 is positioned in the upper surface 20. A non-slip base 24 may be attached to an underside of the support 18.

A driving plate 26 is positioned on the upper surface 20 and has a proximal end 27 with respect to the front end 21. The proximal end 27 is slidably movable toward and away from the front end 21. The driving plate 26 has a first slot 28 therein and a second slot 29 therein. The first 28 and second 29 slots are configured to receive the second half loop 14 and the middle half loop 15 of one of paperclips 12.

A housing 30 is attached to the support 18 and extends upwardly therefrom. The driving plate 26 is slidable through the housing 30. The driving plate 26 is positionable in a receiving position having each of the first 28 and second 29 slots positioned in the housing 30 or in a deployed position with the first 28 and second 29 slots positioned out of the housing 30 between the housing 30 and the front end 21 of the support 18. The housing 30 includes a perimeter wall 31 having a top edge 32 that defines an opening extending into the housing 30. The housing 30 has a top wall 33 removably mounted on the top edge 32 to selectively close the opening. A guide pin 34 is mounted in the perimeter wall 31 and is mated with a guide pin opening 35 in the top wall 33 to ensure that the top wall 33 is properly positioned on the housing 30. A coupler releasably couples the top wall 33 to the top edge 32. The coupler includes a pair of locking pins 36 being attached to and extending upwardly from the perimeter wall 31. Each of the locking pins 36 has a shoulder 37 thereon that engages wires 38 mounted within the top wall 33. The wires

38 slide over the shoulder 37 when the top wall 33 is mounted on the perimeter wall 31 to snap the top wall 33 in place. The top wall 33 is pulled upwardly to cause the wires 38 to snap back over the shoulder 37 and release the top wall 33 from the perimeter wall 31.

A mounting 40 is attached to and extends downwardly from the top wall 33. The mounting 40 extends from the top wall 40 to the driving plate 26 when the top wall 33 is positioned on the top edge 32. The mounting 40 is configured to receive a plurality of aligned ones of the paperclips 12 and gravity feed the paperclips 12 onto the driving plate 26. The mounting 40 includes a first post 41 and a second post 42. The first post 41 is extendable between the first half loop 13 and the middle half loop 15 of the paperclips 12. The second post 42 is extendable between the second half loop 14 and the middle half loop 15 of the paperclips 12. The first post 41 abuts the first half loop 13 and the second post 42 abuts the second half loop 14 when the paperclips 12 are positioned on the mounting 40.

The perimeter wall 31 has a front wall 44 facing the front edge 21. The front wall 44 has an aperture 45 extending therethrough adjacent to a bottom end 46 of the perimeter wall 31. A flange 47 is attached to an inner surface of the front below and adjacent to the aperture 45 and extends inwardly of the housing 12. The flange 47 abuts the first half loop 13 of a lowermost one of the paperclips 12 when the paperclips 12 are positioned in the housing 30. The flange 47 forces the first half loop 13 upwardly over the flange 47 when the second half loop 14 and inner half loop 15 of an associated one of the paperclips 12 are placed in the first 28 and second 29 slots and forced toward the forward end 21 and under the flange 47 by the driving plate. The flange 47 and a perimeter edge of the aperture 45 is angled upwardly from the flange 47 to an outer surface of the perimeter wall 31 to more further force the first half loop 13 upwardly away from a plane of the associated second 14 and inner 15 half loops.

An actuator 48 is mechanically coupled to the driving plate 26 to selectively move the driving plate 26 toward or away from the front end 21. The actuator 48 includes a handle 49 that is pivotally coupled to the housing 30 and extends toward the rear end 22 of the support 18. A drive rod 50 has a first end 51 pivotally coupled to the handle 49 and a second end 52 attached to the driving plate 26. The drive rod 50 forces the driving plate 26 toward the front end 21 when the handle 49 is depressed. A biasing member 53 is mounted to the support 18 and is attached to the driving plate 26. The biasing member 53 biases the driving plate 26 toward the rear end 22 of the support 18.

A magnet 54 is mounted in the support 18 and is positioned beneath the housing 30. The magnet 54 pulls any paperclips 12 in the housing 30 toward the driving plate 26. This prevents the paperclips 12 from snapping upwardly away from the flange 47.

An upper paper guide 56 is attached to the front wall 44 and is positioned above and adjacent to the aperture 45. The upper paper guide 56 extends outwardly from the front wall 44 and has a lower surface that is angled upwardly from the front wall 44. A lower paper guide 58 is attached to and extends upwardly from the front end 21 of the support 18. The lower paper guide 58 has an upper edge 59 having a notch 60 extending downwardly therein. The notch 60 provides a paperclip receiving space between the support 18 and paper 8 positioned to receive a paperclip 12. The upper 56 and lower 58 paper guides ensure that the paper 8 is properly positioned to receive the paper clip 12 as it is opened by the flange 47 and pushed outwardly of the housing 30 by the driving plate 26.

Figure 7:
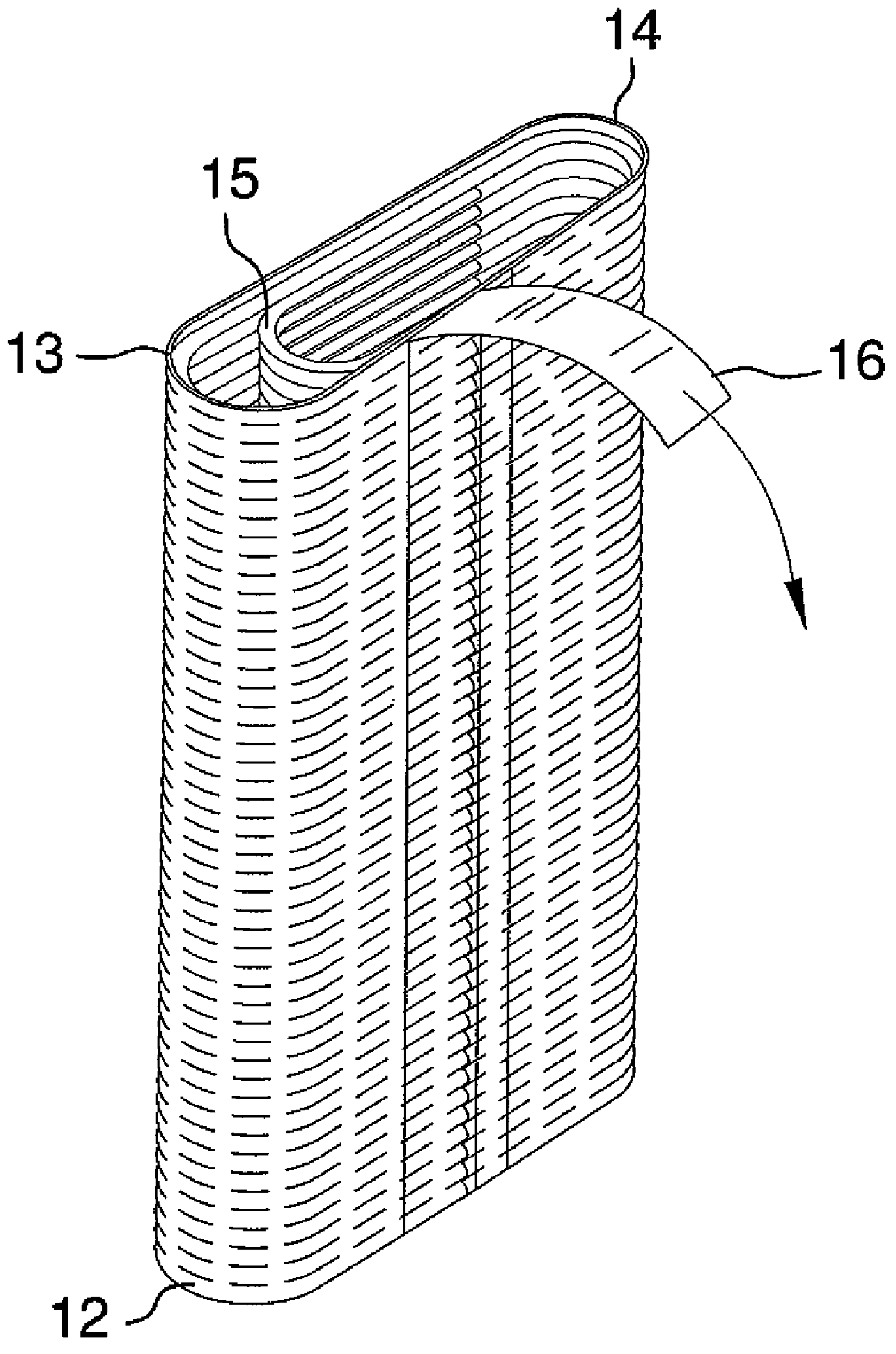
FIG. 7 is a perspective view of paperclips of the present invention.
Figure 8:
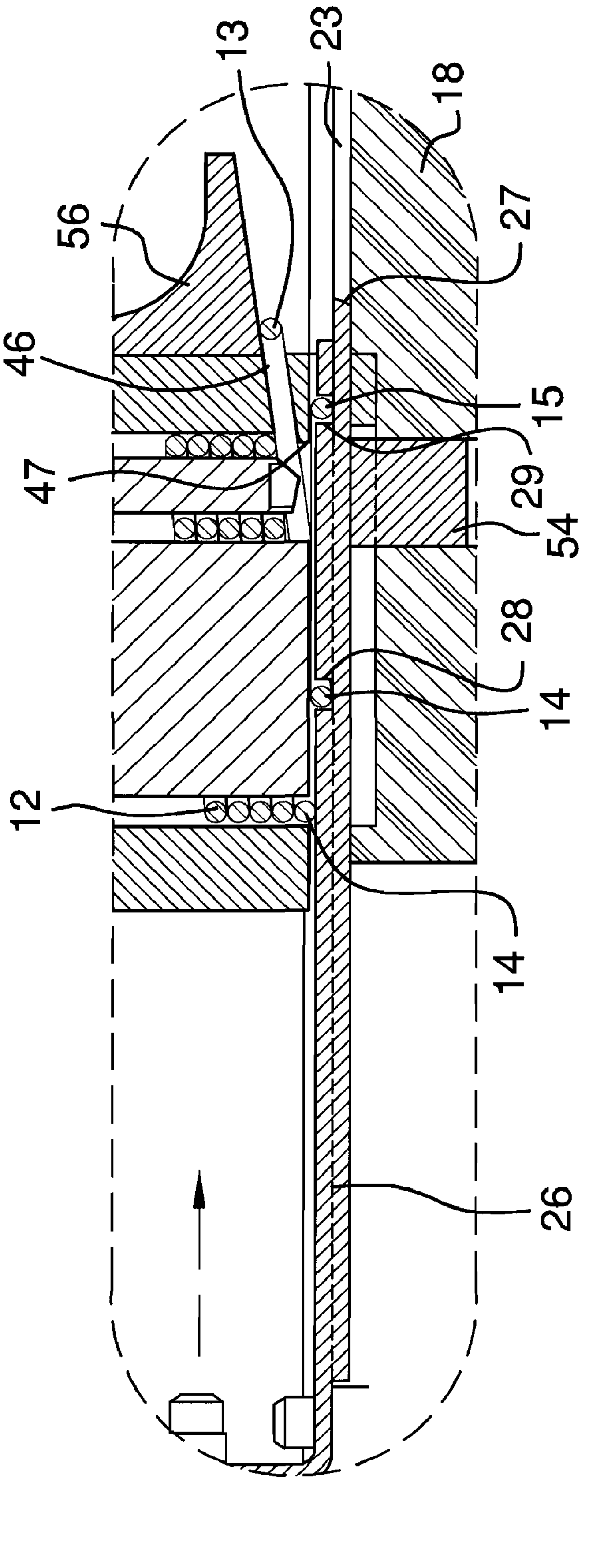
FIG. 8 is an enlarged view of area "8" of FIG. 5A the present invention.

In use, a plurality of paperclips 12, coupled together and aligned with each other as shown in FIG. 7, are positioned in the housing 30 as described above and as shown in the Figures. A person may place one or more sheets of paper 8 to be clipped together between the upper 56 and lower 58 paper guides and then the person may depress the handle 49 to force a paperclip 12 out of the housing 30 and onto the sheets of paper 8. The biasing member 53 then pulls the driving plate 26 back to the receiving position so that the next paperclip 12 in line falls into the first 28 and second 29 slots. When the housing 30 is voided of paperclips 12, the top wall 33 is removed and another set of aligned paperclips 12 is positioned on the mounting 40, the tab 16 is removed and the mounting 40 extended back into the housing 30.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A paperclip fastening apparatus for holding a plurality of paperclips and positioning a paperclip on one or more sheets of paper, the paperclips each having a first half loop, a second half loop and an inner half loop positioned between the first and second half loops and nearer to the first loop than the second half loop, said apparatus comprising:

a support having an upper surface, a front end and a rear end, a track being positioned in said upper surface;

a driving plate being positioned on said upper surface and having a proximal end with respect to said front end, said proximal end being slidably movable toward and away from said front end, said driving plate having a first slot therein and a second slot therein, said first and second slots configured to receive the second half loop and the inner half loop of one of the paperclips;

a housing being attached to said support and extending upwardly therefrom, said driving plate being slidable through said housing and engaging a lowermost one of any paperclips positioned in said housing, said driving plate being positionable in a receiving position having each of said first and second slots positioned in said housing or in a deployed position having said first and second slots positioned out of said housing between said housing and said front end of said support, said housing including a perimeter wall having a top edge, said top edge defining an opening extending into said housing, said housing having a top wall removably mounted on said top edge to selectively close said opening;

a mounting being attached to and extending downwardly from said top wall, said mounting extending from said top wall to said driving plate when said top wall is positioned on said top edge, said mounting being configured to receive a plurality of aligned ones of the paperclips and gravity feeding the paperclips onto said driving plate; and said perimeter wall having a front wall facing said front edge, said front wall having an aperture extending therethrough adjacent to a bottom end of said perimeter wall, a flange being attached to an inner surface of said front wall below and adjacent to said aperture and extending inwardly of said housing, said flange abutting the first half loop of a lowermost one of the paperclips when the paperclips are positioned in said housing, said flange forcing the first half loop upwardly when the second half loop and inner half loop of an associated one of the paperclips are placed in said first and second slots and forced toward said front end and under said flange by said driving plate.

2. The apparatus according to claim 1, wherein said mounting includes a first post and a second post, said first post being extendable between the first half loop and the inner half loop of the paperclips, said second post being extendable between the second half loop and the inner half loop of the paperclips.

3. The apparatus according to claim 2, wherein said first post abutting the first half loop and said second post abutting the second half loop of any of the paperclips positioned on said mounting.

4. The apparatus according to claim 1, wherein said flange and a perimeter edge of said aperture are angled upwardly from said flange to an outer surface of said perimeter wall to more further force said first half loop upwardly away from a plane of the associated second and inner half loops.

5. The apparatus according to claim 1, further including an actuator being mechanically coupled to said driving plate to selectively move said driving plate toward or away from said front end.

6. The apparatus according to claim 5, wherein said actuator includes:

a handle being pivotally coupled to said housing and extending toward said rear end of said support; and a drive rod having a first end pivotally coupled to said handle and a second end attached to said driving plate, said drive rod forcing said driving plate toward said front end when said handle is depressed.

7. The apparatus according to claim 6, wherein said actuator further includes a biasing member being mounted to said support and being attached to said driving plate, said biasing member biasing said driving plate toward said rear end of said support.

8. The apparatus according to claim 1, further including a magnet being mounted in said support and being positioned beneath said housing, said magnet pulling any paperclips in said housing toward said driving plate.

9. The apparatus according to claim 1, further including an upper paper guide being attached to said front wall and being positioned above and adjacent to said aperture, said upper paper guide extending outwardly from said front wall and having a lower surface being angled upwardly from said front wall.

10. The apparatus according to claim 9, further including a lower paper guide being attached to and extending upwardly from said front end of said support, said lower paper guide having an upper edge having a notch extending downwardly therein, said notch providing a paperclip receiving space between said support and paper positioned to receive a paperclip.

11. A paperclip fastening apparatus for holding a plurality of paperclips and positioning a paperclip on one or more sheets of paper, the paperclips each having a first half loop, a second half loop and an inner half loop positioned between the first and second half loops and nearer to the first loop than the second half loop, said apparatus comprising:

a support having an upper surface, a front end and a rear end, a track being positioned in said upper surface;

a driving plate being positioned on said upper surface and having a proximal end with respect to said front end, said proximal end being slidably movable toward or away from said front end, said driving plate having a first slot therein and a second slot therein, said first and second slots configured to receive the second half loop and the inner half loop of one of paperclips;

a housing being attached to said support and extending upwardly therefrom, said driving plate being slidable through said housing, said driving plate being positionable in a receiving position having each of said first and second slots positioned in said housing or in a deployed position having said first and second slots positioned out of said housing between said housing and said front end of said support, said housing including a perimeter wall having a top edge, said top edge defining an opening extending into said housing, said housing having a top wall removably mounted on said top edge to selectively close said opening, a coupler releasably coupling said top wall to said top edge;

a mounting being attached to and extending downwardly from said top wall, said mounting extending from said top wall to said driving plate when said top wall is positioned on said top edge, said mounting being configured to receive a plurality of aligned ones of the paperclips and gravity feeding the paperclips onto said driving plate, said mounting including a first post and a second post, said first post being extendable between the first half loop and the inner half loop of the paperclips, said second post being extendable between the second half loop and the middle half loop of the paperclips, said first post abutting the first half loop and said second post abutting the second half loop of any of the paperclips positioned on said mounting;

said perimeter wall having a front wall facing said front edge, said front wall having an aperture extending therethrough adjacent to a bottom end of said perimeter wall, a flange being attached to an inner surface of said front wall below and adjacent to said aperture and extending inwardly of said housing, said flange abutting the first half loop of a lowermost one of the paperclips when the paperclips are positioned in said housing, said flange forcing the first half loop upwardly when the second half loop and inner half loop of an associated one of the paperclips are placed in said first and second slots and forced toward said forward end and under said flange by said driving plate, said flange and a perimeter edge of said aperture being angled upwardly from said flange to an outer surface of said perimeter wall to more further force said first half loop upwardly away from a plane of the associated second and inner half loops;

an actuator being mechanically coupled to said driving plate to selectively move said driving plate toward or away from said front end, said actuator including;

a handle being pivotally coupled to said housing and extending toward said rear end of said support;

a drive rod having a first end pivotally coupled to said handle and a second end attached to said driving plate, said drive rod forcing said driving plate toward said front end when said handle is depressed;

a biasing member being mounted to said support and being attached to said driving plate, said biasing member biasing said driving plate toward said rear end of said support;

a magnet being mounted in said support and being positioned beneath said housing, said magnet pulling any paperclips in said housing toward said driving plate;

an upper paper guide being attached to said front wall and being positioned above and adjacent to said aperture, said upper paper guide extending outwardly from said front wall and having a lower surface being angled upwardly from said front wall; and a lower paper guide being attached to and extending upwardly from said front end of said support, said lower paper guide having an upper edge having a notch extending downwardly therein, said notch providing a paperclip receiving space between said support and paper positioned to receive a paperclip.

12. A paperclip fastening system for positioning a paperclip on one or more sheets of paper including:

a plurality of paperclips, said paperclips each having a first half loop, a second half loop and an inner half loop positioned between the first and second half loops and nearer to the first loop than the second half loop, said paperclips being aligned with each other, a removable tab being adhered to each of said paperclips to retain said paperclips in alignment with each other;

a support having an upper surface, a front end and a rear end, a track being positioned in said upper surface;

a driving plate being positioned on said upper surface and having a proximal end with respect to said front end, said proximal end being slidably movable toward or away from said front end, said driving plate having a first slot therein and a second slot therein, said first and second slots configured to receive the second half loop and the inner half loop of one of the paperclips;

a housing being attached to said support and extending upwardly therefrom, said driving plate being slidable through said housing and engaging a lowermost one of said paperclips positioned in said housing, said driving plate being positionable in a receiving position having each of said first and second slots positioned in said housing or in a deployed position having said first and second slots positioned out of said housing between said housing and said front end of said support, said housing including a perimeter wall having a top edge, said top edge defining an opening extending into said housing, said housing having a top wall removably mounted on said top edge to selectively close said opening;

a mounting being attached to and extending downwardly from said top wall, said mounting extending from said top wall to said driving plate when said top wall is positioned on said top edge, said mounting being having a plurality of aligned ones of the paperclips thereon and gravity feeding the paperclips onto said driving plate; and said perimeter wall having a front wall facing said front edge, said front wall having an aperture extending therethrough adjacent to a bottom end of said perimeter wall, a flange being attached to an inner surface of said front wall below and adjacent to said aperture and extending inwardly of said housing, said flange abutting the first half loop of the lowermost one of the paperclips, said flange forcing the first half loop upwardly when the second half loop and inner half loop of an associated one of the paperclips are placed in said first and second slots and forced toward said forward end and under said flange by said driving plate.

13. The apparatus according to claim 12, wherein said mounting includes a first post and a second post, said first post being extendable between the first half loop and the inner half loop of the paperclips, said second post being extendable between the second half loop and the inner half loop of the paperclips.

14. The apparatus according to claim 13, wherein said first post abutting the first half loop and said second post abutting the second half loop said paperclips positioned on said mounting.

15. The apparatus according to claim 12, wherein said flange and a perimeter edge of said aperture are angled upwardly from said flange to an outer surface of said perimeter wall to more further force said first half loop upwardly away from a plane of the associated second and inner half loops.

16. The apparatus according to claim 12, further including an actuator being mechanically coupled to said driving plate to selectively move said driving plate toward or away from said front end.

17. The apparatus according to claim 16, wherein said actuator includes:

a handle being pivotally coupled to said housing and extending toward said rear end of said support; and a drive rod having a first end pivotally coupled to said handle and a second end attached to said driving plate, said drive rod forcing said driving plate toward said front end when said handle is depressed.

18. The apparatus according to claim 17, wherein said actuator further includes a biasing member being mounted to said support and being attached to said driving plate, said biasing member biasing said driving plate toward said rear end of said support.

19. The apparatus according to claim 12, further including a magnet being mounted in said support and being positioned beneath said housing, said magnet pulling paperclips toward said driving plate.

20. The apparatus according to claim 12, further including;

an upper paper guide being attached to said front wall and being positioned above and adjacent to said aperture, said upper paper guide extending outwardly from said front wall and having a lower surface being angled upwardly from said front wall; and a lower paper guide being attached to and extending upwardly from said front end of said support, said lower paper guide having an upper edge having a notch extending downwardly therein, said notch providing a paperclip receiving space between said support and paper positioned to receive one of said paperclips.

* * * * *